United States Patent [19]

Brothers et al.

[11] Patent Number: 5,799,083
[45] Date of Patent: Aug. 25, 1998

[54] EVENT VERIFICATION SYSTEM

[76] Inventors: Harlan Jay Brothers, 103 Island View Ter., Branford, Conn. 06405; Chris Hind Genly, 2137 17th Ave., Forest Grove, Oreg. 97116

[21] Appl. No.: 702,815

[22] Filed: Aug. 26, 1996

[51] Int. Cl.$^6$ .................................................... H04L 9/00
[52] U.S. Cl. ......................................... 380/20; 380/23
[58] Field of Search ................................. 380/9, 10, 20, 380/23, 49

[56] References Cited

U.S. PATENT DOCUMENTS 4,882,779  11/1989  Rahtgen ................................. 380/24
5,517,567   5/1996  Epstein ................................. 380/21

Primary Examiner—David C. Cain
Attorney, Agent, or Firm—Robert L. Tucker, Esq.

[57] ABSTRACT

An event verification system comprises an input for the reception of information and an encryption algorithm to encrypt the information; an electronic recorder to record the encrypted information and a decryption algorithm to decrypt recorded information; at least one programmable memory to store at least one cryptographic key for use with the encryption and decryption algorithms; a tamperproof enclosure to protect the input and at least one programmable memory from access or alteration; and, a trusted agent to generate at least one cryptographic key to be used in conjunction with the encryption and decryption algorithms, the trusted agent programming any generated cryptographic key into at least one programmable memory for use with the encryption and decryption algorithms and, upon request, verifying the authenticity of the recorded information by decrypting the recorded information using at least one cryptographic key.

19 Claims, 5 Drawing Sheets

EVENT VERIFICATION SYSTEM

BACKGROUND OF THE INVENTION

1. Field of the Invention

The present invention relates to the accurate and unalterable electronic recording of an event, and more particularly to a tamper-proof means of establishing the authenticity, time, and place of a video recording.

2. Description of the Prior Art

With the advent of inexpensive and light-weight video cameras, filmed evidence of events has become commonplace. Professionals and amateurs alike offer what is often critical evidence of a specific event in video format. While such evidence is generally welcome in our legal system and in scientific circles, it is often difficult to ascertain whether a recording has been doctored or tampered with. There is also no verifiable means of establishing the time and/or place of the recording. In addition, running counter to this relatively recent approach of using video tape as proof of an event is the ability of advanced computer systems to undetectably alter prerecorded video information. Indeed, with advances in computer architecture and digital processing techniques, the time is not far off when computers will be able to wholly generate lifelike video without any "real" input. Furthermore, in cases where an evidentiary recording might be lost or destroyed, there is currently no means for providing a backup copy of at least a portion of the recorded information for storage in a safe and remote location.

SUMMARY OF THE INVENTION

Accordingly, it is an object of the present invention to provide a means for the electronic verification of an event which has been recorded by a video camera.

Another object is to provide such a means that will prevent the effective alteration of video information after it has been recorded.

A further object is to provide such a means that will unequivocally establish the time of a video recording.

It is also an object to provide such a means that will unequivocally establish the location of a video recording.

It is another object to provide such a means that will provide a reliable and tamper-proof means of authentication.

It is also an object to provide such a means that will allow the transmission of recorded and verifiable information to a remote and safe location.

It is a further object to provide such a means that employs existing and proven technology.

It is still a further object to provide such a means that is affordable and easy to use.

It has been found that the above and other objects of the present invention are obtained in an Event Verification System comprising an input for the reception of information, an encryption algorithm to encrypt the information, an electronic recorder to record the encrypted information, a decryption algorithm to decrypt recorded information; and, at least one programmable memory to store at least one cryptographic key for use with the encryption and decryption algorithms. A tamperproof enclosure is included to protect the input and at least one programmable memory from access or alteration. A trusted agent serves to generate at least one cryptographic key to be used in conjunction with the encryption and decryption algorithms, the trusted agent programming any generated cryptographic key into at least one programmable memory for use with the encryption and decryption algorithms and, upon request, verifying the authenticity of the recorded information by decrypting the recorded information using at least one cryptographic key.

In a preferred embodiment, the input comprises video information.

Preferably, the video information is derived from a video camera.

In a preferred embodiment, video camera includes at least one range sensor whose output is encrypted and then recorded by the electronic recorder.

In a preferred embodiment, the encryption and decryption algorithms use a single key system.

In an alternative embodiment, the encryption and decryption algorithms use a public key system.

In a preferred embodiment, at least one cryptographic key is encrypted.

Preferably, the tamperproof enclosure includes a detector to monitor the integrity of the tamperproof enclosure and, upon any breach of integrity, to send a signal that results in the destruction of any cryptographic key stored in a programmable memory within the tamperproof enclosure.

In a preferred embodiment, the tamperproof enclosure includes an electronic security measure that monitors the state of the tamperproof enclosure from the time of manufacture and reveals any breach of the tamperproof enclosure to the trusted third party.

Preferably, the input includes time data.

Preferably, the input includes location data.

In a preferred embodiment, time data is derived from the Global Positioning System.

In a preferred embodiment, location data is derived from the Global Positioning System.

In a preferred embodiment, a transmitter sends at least a portion of the encrypted data to a remote location.

Preferably, the encrypted data is sent to the remote location by means of a wireless link.

In a preferred embodiment, the encrypted data is sent to the remote location by means of a satellite link.

In a preferred embodiment, an Event Verification System comprises a video camera for the reception of information, an encryption algorithm to encrypt the information, an electronic recorder to record the encrypted information, a decryption algorithm to decrypt recorded information; and, at least one programmable memory to store at least one cryptographic key for use with the encryption and decryption algorithms. A tamperproof enclosure is included to protect the input and at least one programmable memory from access or alteration. A trusted agent serves to generate at least one cryptographic key to be used in conjunction with the encryption and decryption algorithms, the trusted agent programming any generated cryptographic key into at least one programmable memory for use with the encryption and decryption algorithms and, upon request, verifying the authenticity of the recorded information by decrypting the recorded information using at least one cryptographic key. At least one range sensor is included whose output is encrypted by the encryption algorithm and recorded by the electronic recorder. A detector within the tamperproof enclosure monitors the integrity of the tamperproof enclosure and, upon any breach of integrity, sends a signal that results in the destruction of any cryptographic key stored in a programmable memory within the tamperproof enclosure. An electronic security measure is included within the tamperproof enclosure in order to monitor the state of the tamperproof enclosure from the time of manufacture and reveal any breach of the tamperproof enclosure to the trusted third party. A Global Positioning System receiver derives time and location data which is encrypted by the encryption algorithm and recorded by the electronic recorder. A transmitter sends at least a portion of the encrypted data to a remote location.

Other features and advantages of the present invention will become apparent from the following description of the invention which refers to the accompanying drawings.

BRIEF DESCRIPTION OF THE DRAWING(S)

For the purpose of illustrating the invention, there is shown in the drawings an embodiment which is presently preferred; it being understood, however, that the invention is not limited to the precise arrangements and instrumentalities shown.

DETAILED DESCRIPTION OF THE PREFERRED EMBODIMENT

Figure 1:
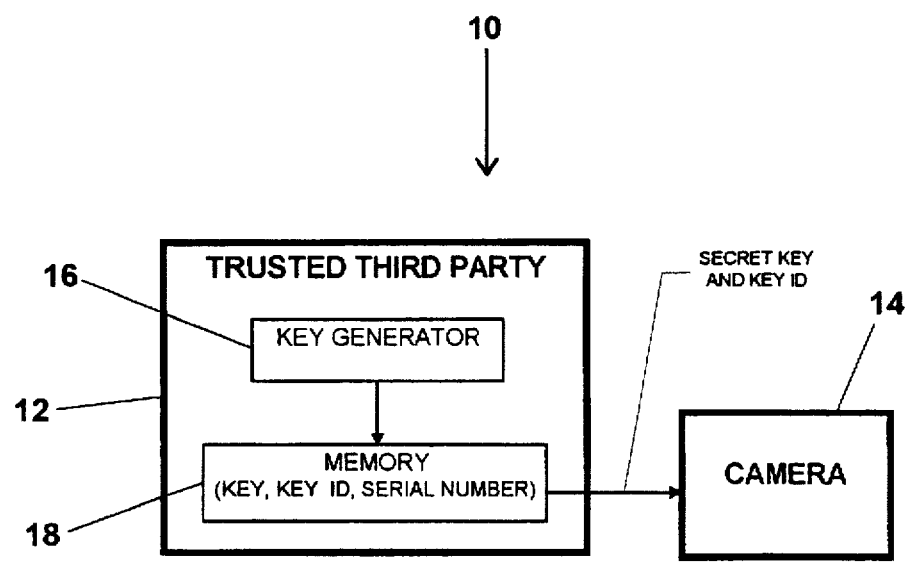
FIG. 1 is a block diagram showing an overview of the single key Event Verification System.

Referring now to FIG. 1, a single key Event Verification System 10 comprises a trusted third party 12 and a video camera 14 which employ a single key encryption technique. The technique is implemented through means of key generation, encryption, and decryption.

The trusted third party 12 creates a secret key using a key generator 16, and programs the camera 14 with the secret key and an identification code that is unique to the key. The trusted third party 12 stores the secret key, the key identification code, and the manufacturer's serial number of the camera 14 in long term memory 18. The trusted third party 12 also safeguards the secret key in memory 18 so that no other party can learn it. Thus, there are only two copies of the secret key—one that exists in the camera 14 and one that is safeguarded by the trusted third party 12.

Figure 2:
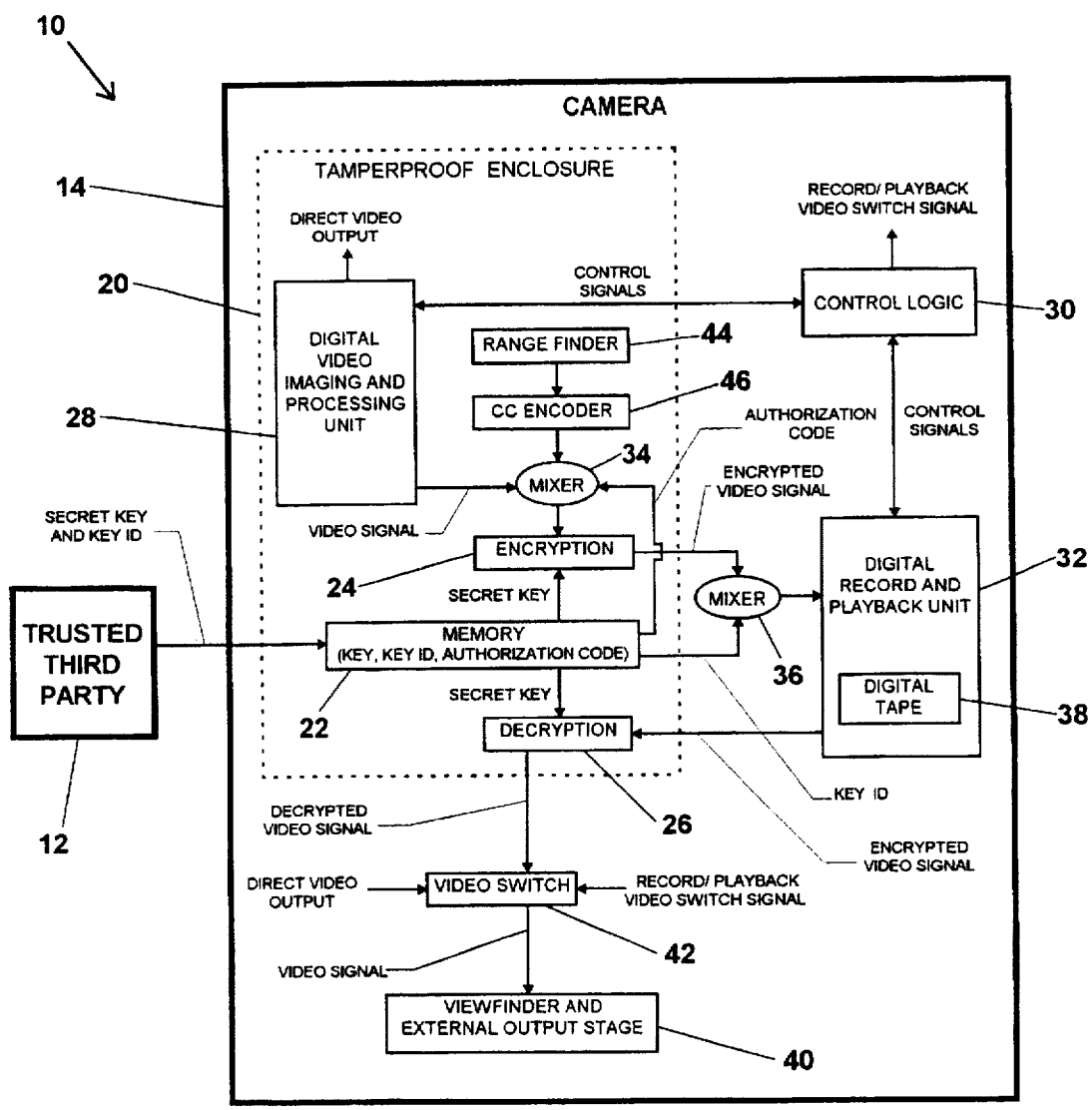
FIG. 2 shows a detailed block diagram of the single key Event Verification System.

Referring now to FIG. 2, the camera 14 includes a tamperproof enclosure 20. Within the tamperproof enclosure 20 is a memory 22. Memory 22 is used to store the secret key, the key identification code, and an authorization code that is programmed into the memory 22 by the manufacturer of the camera 14 at the time of manufacture. The authorization code is a secret code that is unique to each camera and can therefore correspond to the unique serial number, or other public identification code, of the camera 14. The authorization code is known only by the manufacturer and the trusted third party 12 with whom the manufacturer secretly and securely shares information regarding valid camera serial numbers and their corresponding authorization codes.

The tamperproof enclosure 20 is constructed so that if it is breached, the secret key, the key identification code, and the secret authorization code are automatically erased from memory 22. The automatic erasure of the information in memory 22 can be accomplished through any number of means including broken current sensing, photodetection, pressure sensing, and capacitative sensing to name a few. The secret key is used by the encryption unit 24 and the decryption unit 26 to encrypt and decrypt, respectively, the video signal originating from the digital video imaging and processing unit 28. Therefore, if the secret key is erased, it is impossible for a party to forge or alter a recording since the only valid key publicly available for encrypting data is destroyed. The digital video imaging and processing unit 28 is also located within the tamperproof housing 20 in order to prevent a party from successfully introducing a pre-recorded or electronically altered recording or a computer generated event into the encryption unit 24.

It should be realized by those skilled in the art that only those components for which security is essential are described as being located within the tamperproof enclosure 20. Indeed, if so desired, the entire camera 14 can be constructed as a tamperproof enclosure whereby any breach or opening of its casing would result in the destruction of the information in memory 22.

In a preferred embodiment, to use the single key Event Verification System 10, the user begins recording an event with the camera 14. Control logic 30 uses control signals to activate and communicate with the digital video imaging and processing unit 28 and the digital record and playback unit 32. The digital video imaging and processing unit 28 produces a video signal and passes it through the mixer 34 to the encryption unit 24 where it is encrypted with the secret key that is stored in memory 22. The encrypted video signal leaves the tamperproof enclosure 20 and passes through a second mixer 36 into the digital record and playback unit 32 where it is recorded onto a digital tape 38.

It should be realized by those skilled in the art that the present invention is not limited to the use of digital tape 38. Any electronic or optical method of recording can be employed in a manner consistent with the present invention.

In a preferred embodiment, the key identification code resides in memory 22 and is recorded through mixer 36, along with the encrypted video signal, onto the digital tape 38 by the digital record and playback unit 32. Preferably, the authorization code also resides in memory 22 and is mixed into the video stream by mixer 34 before being encrypted by the encryption unit 24 and passed through the mixer 36 to be recorded onto the digital tape 38 by the digital record and playback unit 32. There is no need to keep the digital tape 38 secure because it contains encrypted data which can only be decoded or altered using the secret key. Upon playback, the encrypted video signal is sent to the decryption unit 26 within the tamperproof enclosure 20. The decryption unit 26 then passes the decrypted video signal to the viewfinder and external output stage 40 through a video switch 42.

In a preferred embodiment, the video switch 42 is employed so that the digital video imaging and processing unit 28 can bypass the encryption unit 24 and the digital record and playback unit 32 and send a direct video output signal to the viewfinder and external output stage 40. Control logic 30 sets the state of the video switch 42 so that when the camera 14 is recording, the video switch 42 feeds the direct video output to the viewfinder and external output stage 40. However, when the camera 14 plays back the digital tape 38, the video switch 42 feeds the decrypted video signal from the decryption unit 26 to the viewfinder and external output stage 40. Because cryptographic algorithms take time to process data, depending on the speed and implementation of the cryptographic algorithm used by the camera 14, the video switch 42 may be required in order to insure that there is no discernible delay between the actual event being recorded and the image of the event as seen through the viewfinder and external output stage 40. A sufficiently fast cryptographic method may obviate the need for a video switch.

In a preferred embodiment, a range finder 44 measures the distance between the camera 14 and the subject or event that is being recorded. This type of measurement is typically accomplished using ultrasonic transducers, although photo-detection techniques, stereoscopic recording, or other techniques could alternatively be employed. Preferably, the distance information produced by the range finder 44 is encoded by a closed caption encoder 46. The closed caption encoder 46 functions like the Line 21 encoder used in analog NTSC systems, so that when the digital tape 38 is played back, the distance information can be easily viewed. The distance information passes from the closed caption encoder 46 through the mixer 34 where it is mixed into the video stream in a manner appropriate to the particular video standard being used. The combined video and closed caption data is encrypted by the encryption unit 24. The encrypted data stream is then mixed with the key identification code by mixer 36 and recorded onto the digital tape 38. The recording of distance information accomplishes two things. First, it increases knowledge of the event being recorded. Second, it helps to reveal whether the recorded event was simply projected onto a screen from which it was then filmed. Indeed, more than one range sensor, or type of range sensor, can be employed to gather information about the environment in which the recording was made. For instance, a combination of stereoscopic recording and ultrasonic ranging would allow a very complete recording of an event and its immediate surroundings.

If authentication of a recorded event is required, the verification process can only be performed by the trusted third party 12. The encrypted digital tape 38, which includes the unencrypted identification code of the key that was used to produce it, and also the encrypted manufacturer's authorization code, is brought to the trusted third party 12. The trusted third party 12 then references the key identification code to obtain the safeguarded secret key and the serial number of the camera 14 from memory 18, FIG. 1. If the referenced secret key decrypts the digital tape 38, and the serial number of the camera 14 correctly corresponds to the decrypted authorization code that was originally programmed into the camera 14 by the manufacturer, then the tape can be considered an authentic record of an actual event. Verification that the serial number of the camera 14 and the authorization code for the camera 14 correspond to the information secretly and securely provided by the manufacturer, allows the trusted third party 12 to reasonably assert two things; first, that the tamperproof enclosure 20 was not disabled or modified between the time of manufacture and the time of key generation and programming, and second, that the camera 14 is not a clone that was illegally manufactured to be identical to the original with the exception of employing a disabled or modified tamperproof enclosure 20 which can in fact be breached or otherwise compromised without resulting in the destruction of the information in memory 22.

Figure 3:
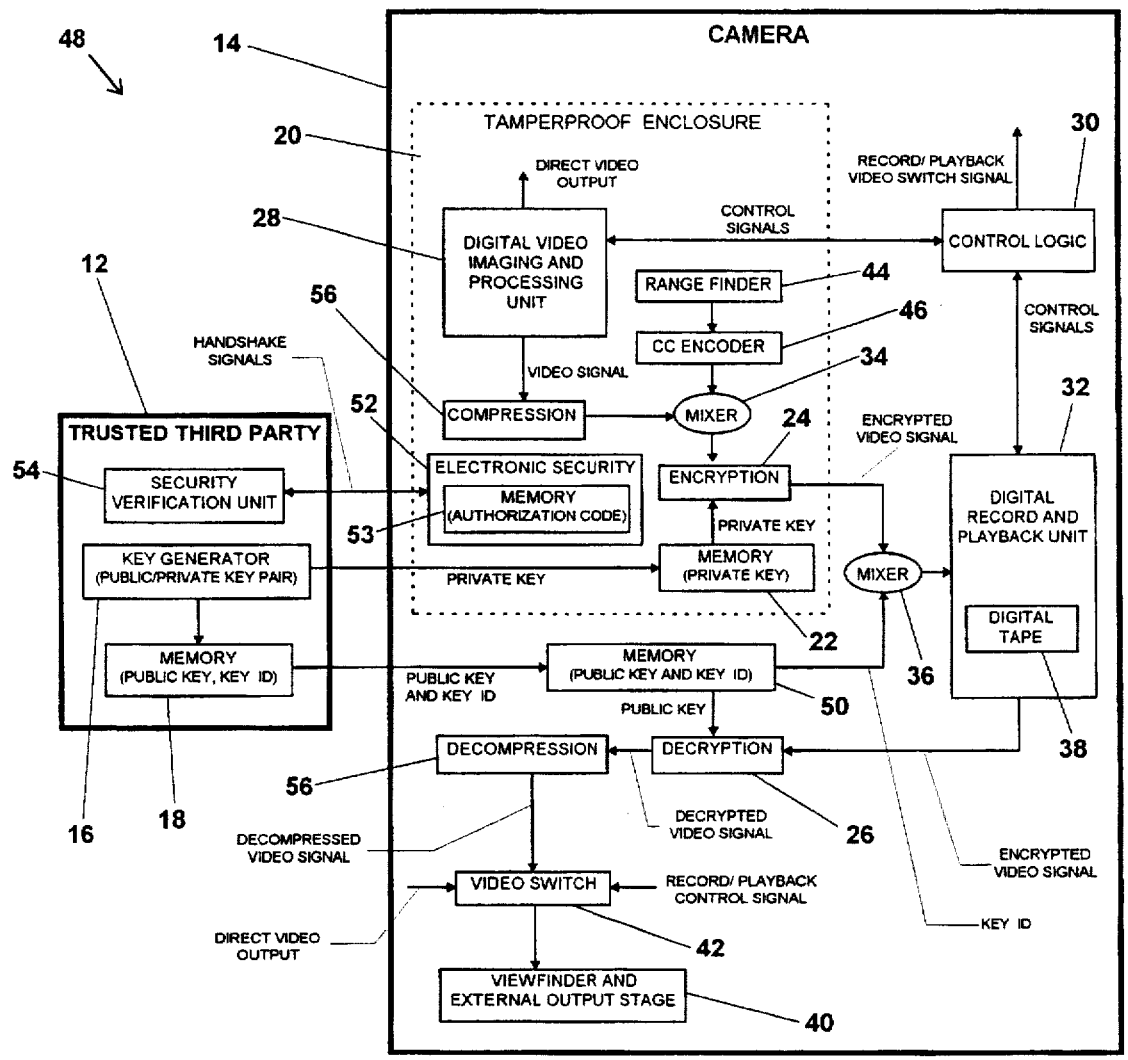
FIG. 3 shows a detailed block diagram of the public key Event Verification System.

Referring now to FIG. 3, a public key Event Verification System 48 comprises a trusted third party 12 and a video camera 14 which employ a public key encryption technique. In a public key embodiment of the present invention, the trusted third party 12 creates a public/private key pair using a key generator 16. The trusted third party 12 programs the camera 14 with the public/private key pair. The public key is programmed into memory 50 and the private key is programmed in memory 22 which is located within the tamperproof enclosure 20. The trusted third party 12 also programs the camera 14 with an identification code that is unique to the public/private key pair. After programming the camera 14, the trusted third party 12 destroys the original and any other copies of the private key in its possession. In addition, the trusted third party 12 stores the public key and the key pair identification code in long term memory 18. There is no need for the trusted third party 12 to safeguard the public key because it is designed to be shared publicly. In fact, the trusted third party 12 is free to publish the public key so that the verification process can be carried out by other parties as well. Because the original private key has been destroyed, the only copy of the private key that exists is the one that has been programmed into memory 22 of the camera 14. As in the case of the single key Event Verification System 10, FIG. 2, the tamperproof enclosure 20 is constructed so that if it is breached, the information in memory 22 is automatically erased. Erasure of the memory 22 prevents a party from learning the private key in order to forge or tamper with a recording.

In a preferred embodiment, to insure that the camera 14 is not an intentionally compromised illegal clone or that its tamperproof enclosure 20 has not been modified between the time of manufacture and the time of key generation and programming, an electronic security unit 52 stores an authorization code that is programmed into a memory 53 by the manufacturer of the camera 14 at the time of manufacture. The authorization code is a secret code that is unique to each camera and can therefore correspond to the unique serial number, or other public identification code, of the camera 14. The authorization code is known only by the manufacturer and the trusted third party 12 with whom the manufacturer secretly and securely shares information regarding valid camera serial numbers and their corresponding authorization codes. Once the camera 14 is programmed with the authorization code, at no time does the authorization code leave the electronic security unit 52. Furthermore, any breach of the tamperproof enclosure 20 results in the destruction of the authorization code in memory 53.

The electronic security unit 52 works like an electronic lock. The electronic security unit 52 responds only to the unique authorization code that is secretly and securely supplied to the t rusted third party 12 by the manufacturer of the camera 14. When the camera 14 is brought to the trusted third party 12 for key programming, the trusted third party 12 uses a security verification unit 54 to perform an electronic handshaking routine with the electronic security unit 52 that establishes the authenticity of the tamperproof enclosure 20 by ascertaining that the proper authorization code resides in memory 53. In the event that the tamperproof enclosure 20 has been breached or compromised, the authorization code will be destroyed, the electronic handshaking routine will fail, and the trusted third party 12 will not program the camera 14 with the required cryptographic keys.

To insure that the electronic security unit 52 itself is authentic, the security verification unit 54, as part of its handshaking routine, might typically send numerous access codes, only one of which is correct. If the electronic security unit 52 does not respond to the correct access code or responds to more than one access code, the trusted third party 12 will not program the camera 14 with the required cryptographic keys. Only in the case where the electronic security unit 52 responds exclusively to the correct authorization code will the trusted third party 12 program the camera 14. Furthermore, the electronic security unit 52 can be designed to shut down for an extended period of time after a predetermined number of authorization code verification attempts. The shut down feature effectively prevents a party from mounting a high speed computer programmed attack on the electronic security unit 52 in an effort to duplicate the authorization code.

It should be realized by those skilled in the art that the combination of an electronic security unit 52 and a security verification unit 54 can also be used in conjunction with the single key Event Verification System 10, FIG. 2, as an alternative to the use of an encrypted manufacturer's authorization code.

In a preferred embodiment, to use the public key Event Verification System 48, the user begins recording an event with the camera 14. Control logic 30 uses control signals to activate and communicate with the digital video imaging and processing unit 28 and the digital record and playback unit 32. The digital video imaging and processing unit 28 produces a video signal which passes through the compression unit 56 and the mixer 34 to the encryption unit 24, where it is encrypted by the private key stored in memory 22.

Because public key systems often produce encrypted files that are larger than the original unencrypted files, in a case where the encryption algorithm increases the bandwidth of the video signal, the compression unit 56 may be employed in order to keep the output of the encryption unit 24 compatible with the appropriate video standard. The compression unit 56 can employ a compression algorithm such as MPEG to reduce the bandwidth of the video signal.

The encrypted video signal leaves the tamperproof enclosure 20 and passes through a second mixer 36 into the digital record and playback unit 32 where it is recorded onto a digital tape 38. Preferably, the key identification code resides in memory 50 and is recorded through mixer 36, along with the encrypted video signal, onto the digital tape 38. There is no need to keep the digital tape 38 secure because although it contains encrypted data which can be decoded by using the public key, the encrypted data cannot be altered without the private key. Upon playback, the encrypted video signal is sent to the decryption unit 26 where it is decrypted using the public key stored in memory 50. The decryption unit 26 then passes the decrypted video signal to the decompression unit 58. The decrypted and decompressed video signal then passes to the viewfinder and external output stage 40 through a video switch 42.

In a preferred embodiment, the video switch 42 is employed so that the digital video imaging and processing unit 28 can send a direct video output signal to the viewfinder and external output stage 40. Control logic 30 determines the state of the video switch 42 so that when the camera 14 is recording, the video switch 42 feeds the direct video output to the viewfinder and external output stage 40. However, when the camera 14 plays back the digital tape 38, the video switch 42 feeds the decrypted and decompressed video signal from the decompression unit 58 to the viewfinder and external output stage 40. Depending on the speed and implementation of the cryptographic algorithm used by the camera 14, the video switch 42 may be required in order to insure that there is no discernible delay between the actual event being recorded and the image of the event as seen through the viewfinder and external output stage 40. A sufficiently fast cryptographic method may obviate the need for a video switch.

In a preferred embodiment, as in the case of the single key Event Verification System 10, FIG. 2, a range finder 44 measures the distance between the camera 14 and the subject or event that is being recorded. Preferably, the distance information produced by the range finder 44 is encoded by a closed caption encoder 46 so that when the digital tape 38 is played back, the distance information can be easily viewed. From the closed caption encoder 46 the distance information passes through the mixer 34 where it is mixed into the video stream in a manner appropriate to the particular video standard being used. The combined video and closed caption data is encrypted by the encryption unit 24. The encrypted data stream is then mixed with the key identification code by mixer 36 and recorded onto the digital tape 38.

It should be realized by those skilled in the art that more than one range sensor can be employed to gather information about the environment in which the recording was made.

If authentication of a recorded event is required, the verification process can be performed by any party obtaining the public key from the trusted third party 12. The encrypted digital tape 38, which includes the unencrypted identification code of the key that was used to produce it, is simply played back on a video player that decodes the tape using the public key that is supplied by the trusted third party 12 and referenced by the key's identification code. It is essential that the party performing the verification ascertains that the public key itself is authentic. This can be accomplished through several means including public publication, direct communication link, and Kerberos to name a few. If the referenced public key decrypts the digital tape 38, then the tape can be considered an authentic record of an actual event.

One of the advantages to using a public key encryption technique is that video cassette players can easily be manufactured to allow any party to perform the verification process. This means that courts, intelligence agencies, news agencies, researchers, journalists, insurance agencies, and others with an interest in the authenticity of recorded events can verify the authenticity of an electronic recording without having to further employ the services the trusted third party 12.

There does exist the remote possibility that an unscrupulous party, given enough time and computing power, might eventually be able break the encryption technique and learn the encryption key (or keys). This would then allow the party to undetectably alter or fabricate a recording. Preferably, in order to guard against this unlikely event, the camera 14 can be reprogrammed periodically with new key and key ID information by the trusted third party 12. Thus, ideally, by the time a unscrupulous party were finally able to learn the encryption key, the key and key ID for the camera 14 would have changed. The trusted third party 12 needs only to compare the time and date at which a given key was used to make a recording against the valid programming dates for the key in question. If the time and date information does not match the assigned key for said time and date, then the recording cannot be deemed authentic.

It should be realized by those skilled in the art that single key and public key encryption techniques are being used for the purpose of illustration and that other encryption techniques or combinations thereof may be employed in a manner consistent with the present invention. For example, it is possible to use a single key technique for the encryption of recorded data with the single key itself encrypted using a public key system.

It should further be realized by those skilled in the art that a video camera is being used for the purpose of illustration and that the Event Verification System can be employed using any electronic recording device in a manner consistent with the present invention. Therefore, for example, audio signals, electronic photographs, electronic odometer readings, or biometric information could all be recorded in a manner consistent with the present invention.

To increase the utility of the present invention, time and/or location information can be incorporated into the recorded data stream. This will not only allow authentication of the recorded event, but also verification of the time and/or place of the recorded event. By inserting this information before the encryption unit 24, FIGS. 2, 3, time and location information can not be effectively altered or tampered with.

Figure 4:
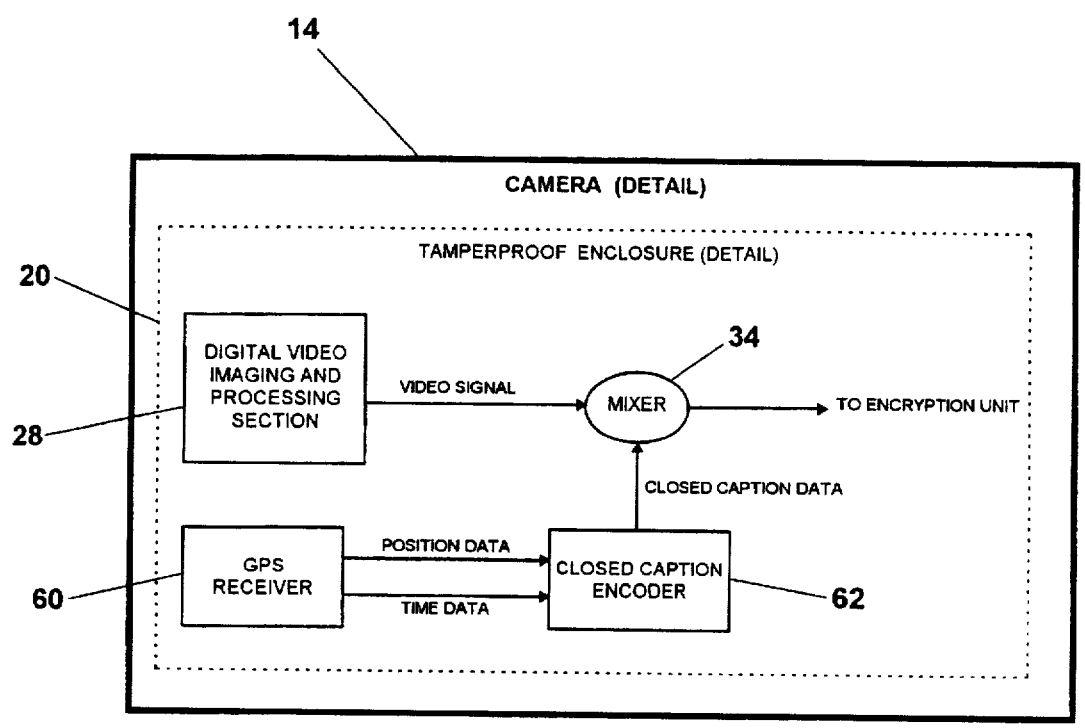
FIG. 4 is a block diagram of a detail of the camera and tamperproof enclosure of the present invention showing a method for time and position measurement and recording.

Referring now to FIG. 4, there is shown a detail of the camera 14 including a portion of the tamperproof enclosure 20. One method of determining both accurate time and position information is to use the Global Positioning System (GPS). In a preferred embodiment, a GPS receiver 60 is located in the tamperproof enclosure 20 to prevent fake time or location information from being introduced into the encrypted data stream. The time and position data can then be encoded using a closed caption encoder 62. Closed caption encoding allows the time and location information to be easily viewed when the digital tape 38 is played back. The closed caption data proceeds to the mixer 34 where it is mixed into the video stream in a manner appropriate to the particular video standard being used.

As a further enhancement of the Event Verification System, it is possible to transmit samples of the recorded encrypted video information to a remote location. Transmission of the encrypted video information to a remote location allows the user to preserve at least a portion of a recorded, verifiable event even if the digital tape 38, FIGS. 2, 3, is lost or destroyed. This video information can be transmitted by any number of means including, for example, telephone line, cable line, ISDN, ADSL, FM radio, cellular link, and satellite link.

Figure 5:
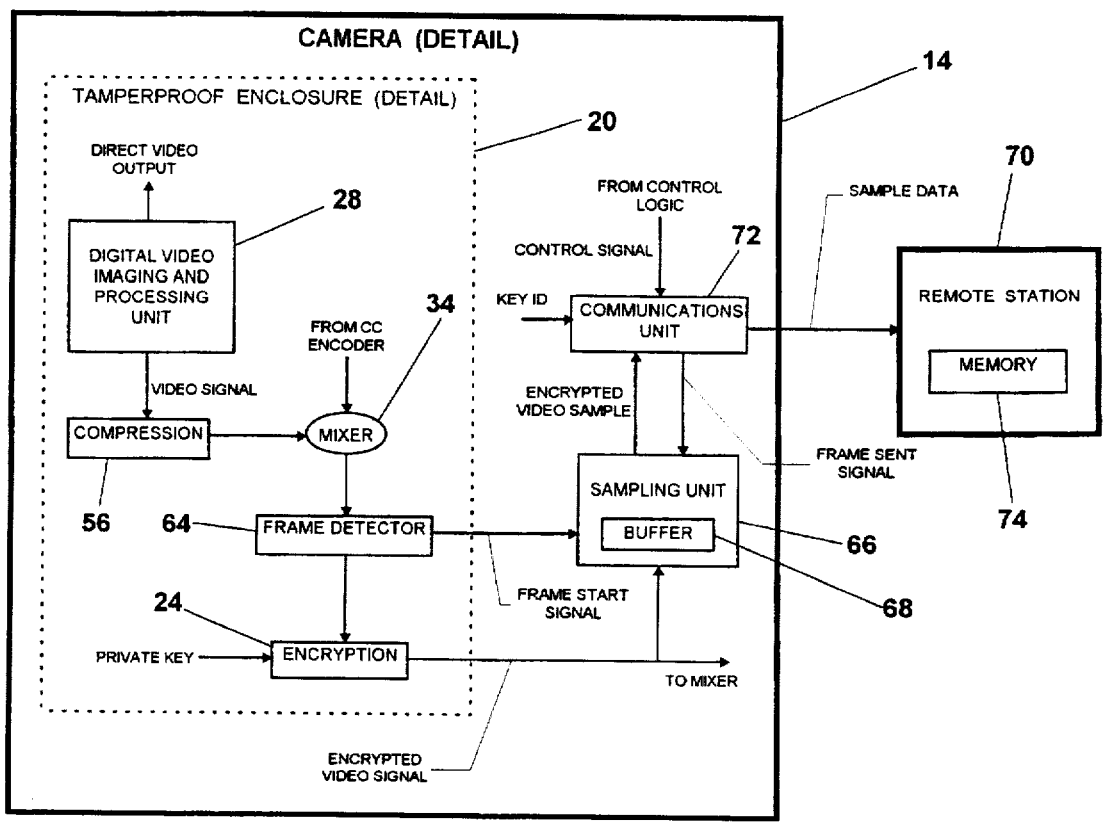
FIG. 5 is a block diagram of a detail of the camera and tamperproof enclosure showing a method for the transmission of data to a remote station.

Referring now to FIG. 5, in a preferred embodiment, the digital video imaging and processing unit 28 produces time code data, such as SMPTE, that is incorporated into the video signal. This time code data is assigned so that each frame of video information includes a unique time code. In addition, each frame includes a frame start code to mark the beginning of each video frame. After passing through the compression unit 56 and the mixer 34, the video signal enters the frame detector 64. When the frame detector 64 encounters a frame start code it sends a frame start signal to the sampling unit 66.

In a preferred embodiment, the sampling unit 66 is designed to select individual frames of encrypted video information from the encryption unit 24 and temporarily store them in buffer 68 for transmission to a remote station 70. Ideally, the encrypted video information could be transmitted in its entirety to the remote station 70. However, given the current bandwidth limitations of hand-held communications technology, a more practical approach at the present time is to send samples of the video data to the remote station 70.

Because the video signal leaving the encryption unit 24 is in encrypted form, the original video frame and format data are not accessible until the encrypted information is decrypted. It is therefore necessary for the sampling unit 66 to know when to begin sampling the encrypted data stream so that a complete frame of video information can be saved in the buffer 68 and then passed on to the communications unit 72.

In a preferred embodiment, the sampling unit 66 always stores the current block of encrypted data from the encryption unit 24 in buffer 68. However, when the sampling unit 66 receives a frame start signal from the frame detector 64 it then continues to store, in buffer 68, all of the encrypted blocks leaving the encryption unit 24. When the sampling unit 66 receives the next frame start signal, it stops loading the buffer 68 at the completion of the current encryption block and begins transferring the stored information to the communications unit 72. When the communications unit 72 has completed transmitting the encrypted frame of information, it sends a frame sent signal to the sampling unit 66. As soon as the sampling unit 66 receives the frame sent signal from the communications unit 72, the sampling unit 66 resumes storing the current block of encrypted data in buffer 68 and waits for the next frame start signal from the frame detector 64 to begin filling the buffer 68.

It should be realized by those skilled in the art that there are many techniques for buffering communications information depending on considerations such as available memory and bandwidth limitations and that any such buffering technique can be employed in a manner consistent with the present invention.

The communications unit 72 serves to open and close the appropriate communication link and to transmit the contents of the buffer 68 over the communication link. The communications unit 72 can be activated in advance of recording or upon activating the record function on the camera 14, FIGS. 2, 3.

In a preferred embodiment, when the communications unit 72 receives a control signal from the control logic unit 30, FIGS. 2, 3, it opens a communication link to the remote station 70. Upon establishing the link, the communications unit 72 sends the key ID which can serve as a reference number for both decryption and, if necessary, comparison to the original digital tape 38, FIGS. 2, 3. Once the communication link has been established and the buffer 68 contains a frame of encrypted information, the communications unit 72 then proceeds to transmit the contents of the buffer 68 the remote station 70 where it is stored in memory 74. Preferably, the remote station 70 is maintained by the trusted third party 12, FIGS. 1, 2, 3, so that the memory 74 can be verifiably safeguarded against any possible tampering.

Storing the encrypted samples not only preserves a verifiable portion of the recorded event as a backup against loss or destruction of the digital tape 38, but it also contributes an additional measure for authentication. Because the encrypted video frames are stored in memory 74 at the remote station 70 and individually include time code data, these frames can be compared to the corresponding frames recorded on the digital tape 38. Thus, in the unlikely event that, after years perhaps, an unscrupulous party were able to figure out the encryption key and seemlessly alter a previously made recording, individual frames from the altered recording would not match the corresponding frames that were stored at the remote station 70 in memory 74.

It should be realized by those skilled in the art that the present invention is not limited to the precise methods or techniques for the compression and sampling of digital information as described above. Any compression or sampling technique, or combination thereof can be used to record or transmit the Event Verification System data in a manner consistent with the present invention.

It can be seen from the preceding description that the Event Verification System 10 and 48 of the present invention provides an effective means for the verifiable electronic recording of an event. To summarize, using a cryptographic key supplied by the trusted third party 12, the camera 14 encrypts and records an event which can only be decrypted, and thereby authenticated, with the cooperation of the trusted third party 12. The key used for encryption resides in a tamperproof enclosure 20 which if breached destroys the cryptographic key. Thus, without the ability to learn the cryptographic key, it is impossible for a party to undetectably alter a recording that has been made with the camera 14. Additional features enable the verifiable recording of distance, time, and location information. Furthermore, encrypted video information can be transmitted to a remote location as backup against loss or destruction of the original recording.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. An event verification system comprises:
    an input for the reception of information;
    an encryption algorithm to encrypt the information;
    an electronic recorder to record the encrypted information;
    a decryption algorithm to decrypt recorded information;
    at least one programmable memory to store at least one cryptographic key for use with the encryption and decryption algorithms;
    a tamperproof enclosure to protect the input and at least one programmable memory from access or alteration; and
    a trusted agent to generate at least one cryptographic key to be used in conjunction with the encryption and decryption algorithms, the trusted agent programming any generated cryptographic key into at least one programmable memory for use with the encryption and decryption algorithms and, upon request, verifying the authenticity of the recorded information by decrypting the recorded information using at least one cryptographic key.

2. The event verification system of claim 1 wherein the input comprises video information.

3. The event verification system of claim 2 wherein the video information is derived from a video camera.

4. The event verification system of claim 3 wherein video camera includes at least one range sensor whose output is encrypted and then recorded by the electronic recorder.

5. The event verification system of claim 1 wherein the encryption and decryption algorithms use a single key system.

6. The event verification system of claim 1 wherein the encryption and decryption algorithms use a public key system.

7. The event verification system of claim 1 wherein at least one cryptographic key is encrypted.

8. The event verification system of claim 1 wherein the tamperproof enclosure includes a detector to monitor the integrity of the tamperproof enclosure and, upon any breach of integrity, to send a signal that results in the destruction of any cryptographic key stored in a programmable memory within the tamperproof enclosure.

9. The event verification system of claim 1 wherein the tamperproof enclosure includes an electronic security measure that monitors the state of the tamperproof enclosure from the time of manufacture and reveals any breach of the tamperproof enclosure to the trusted third party.

10. The event verification system of claim 1 wherein the input includes time data.

11. The event verification system of claim 1 wherein the input includes location data.

12. The event verification system of claim 10 wherein the time data is derived from the Global Positioning System.

13. The event verification system of claim 11 wherein the location data is derived from the Global Positioning System.

14. The event verification system of claim 1 wherein a transmitter sends at least a portion of the encrypted data to a remote location.

15. The event verification system of claim 14 wherein the encrypted data is sent to the remote location by means of a telephone link.

16. The event verification system of claim 14 wherein the encrypted data is sent to the remote location by means of a network link.

17. The event verification system of claim 14 wherein the encrypted data is sent to the remote location by means of a wireless link.

18. The event verification system of claim 14 wherein the encrypted data is sent to the remote location by means of a satellite link.

19. An event verification system comprises:
    a video camera for the reception of information;
    an encryption algorithm to encrypt the information;
    an electronic recorder to record the encrypted information;
    a decryption algorithm to decrypt recorded information;
    at least one programmable memory to store at least one cryptographic key for use with the encryption and decryption algorithms;
    a tamperproof enclosure to protect the input and at least one programmable memory from access or alteration;
    a trusted agent to generate at least one cryptographic key to be used in conjunction with the encryption and decryption algorithms, the trusted agent programming any generated cryptographic key into at least one programmable memory for use with the encryption and decryption algorithms and, upon request, verifying the authenticity of the recorded information by decrypting the recorded information using at least one cryptographic key;
    at least one range sensor whose output is encrypted by the encryption algorithm and recorded by the electronic recorder;
    a detector within the tamperproof enclosure to monitor the integrity of the tamperproof enclosure and, upon any breach of integrity, to send a signal that results in the destruction of any cryptographic key stored in a programmable memory within the tamperproof enclosure;
    an electronic security measure within the tamperproof enclosure that monitors the state of the tamperproof enclosure from the time of manufacture and reveals any breach of the tamperproof enclosure to the trusted third party;
    a Global Positioning System receiver for deriving time and location data which is encrypted by the encryption algorithm and recorded by the electronic recorder; and,
    a transmitter to send at least a portion of the encrypted data to a remote location.

* * * * *